(12) United States Patent
Silva

(10) Patent No.: US 7,177,630 B2
(45) Date of Patent: Feb. 13, 2007

(54) METHOD AND SYSTEM FOR INITIATING WIRELESS PHONE CALLS

(75) Inventor: Joseph M. Silva, Garden Grove, CA (US)

(73) Assignee: Northrop Grumman Corporation, Los Angeles, CA (US)

(*) Notice: Subject to any disclaimer, the term of this patent is extended or adjusted under 35 U.S.C. 154(b) by 786 days.

(21) Appl. No.: 09/873,925

(22) Filed: Jun. 4, 2001

(65) Prior Publication Data

US 2002/0183097 A1 Dec. 5, 2002

(51) Int. Cl.
*H04M 3/42* (2006.01)

(52) U.S. Cl. .............. 455/415; 455/41.2; 455/416; 455/417

(58) Field of Classification Search .......... 455/564, 455/41.2, 565, 519, 415–417, 517, 412.1, 455/414.1, 412.2; 379/211, 142
See application file for complete search history.

(56) References Cited

U.S. PATENT DOCUMENTS

| | | | |
|---|---|---|---|
| 6,253,075 B1 * | 6/2001 | Beghtol et al. ......... | 455/415 |
| 6,351,640 B1 * | 2/2002 | DeMont .................. | 455/426.1 |
| 6,532,372 B1 * | 3/2003 | Hwang ................... | 455/559 |
| 6,785,560 B1 * | 8/2004 | Chow et al. ............ | 455/564 |
| 2002/0173297 A1 * | 11/2002 | Phillips ................. | 455/417 |

* cited by examiner

Primary Examiner—Edward F. Urban
Assistant Examiner—Raymond S. Dean
(74) Attorney, Agent, or Firm—Carmen B. Patti & Assoc., LLC

(57) ABSTRACT

A wireless call management system (10) for initiating wireless phone calls includes a request module (20), an initiation module (30), and a wireless phone user interface (40) and only requires knowledge of the requesting party's phone number. The request module (20) transmits outgoing call initiation requests to remote users based on local requests from a local user (16). The initiation module (30) requests authorization from the local user (16) based on incoming call initiation requests. The incoming call initiation requests include phone numbers corresponding to the remote users (18). The wireless phone user interface (40) generates the outgoing call initiation requests based on the local requests for initiation of phone calls and transmits authorization requests to the local user (16) based on the incoming call initiation requests.

10 Claims, 4 Drawing Sheets

METHOD AND SYSTEM FOR INITIATING WIRELESS PHONE CALLS

BACKGROUND OF THE INVENTION

1. Field of the Invention

The present invention relates generally to the initiation of wireless phone calls. More particularly, the present invention relates to a method and system for initiating wireless phone calls that includes the transmission of call initiation requests between users.

2. Discussion of the Related Art

Wireless phones have rapidly become an integral part of society. This is due in large part to the increasing number of services and functions available from the wireless phone industry. For example, "wireless web" services have revolutionized mobile communications by providing stock information, email capability and scheduling functions all in the palm of the hand. In order for wireless phone providers to maintain a competitive advantage, the search for enhanced functionality continues.

The manner in which wireless phone calls are initiated is referred to herein as "call management" and has typically not received much attention by the industry. For example, it is well known that in order to place a wireless call (or any other call for that matter), the phone number of the remote user must be known to the local user. While most wireless phones include data management systems for phone number and address storage, the phone number must still be known by the local user at some level or point in time. There are some settings, however, in which this is not possible. An example of such a setting would be strangers making eye contact from separate vehicles. While a dialog might be desirable to each of the parties, it is easy to understand that this could be quite difficult given the circumstances. Another example might be a social gathering where other social factors hinder or preclude face-to-face exchange of phone numbers. It is therefore desirable to provide a wireless call management system that enables initiation of a call between users where neither of the users has knowledge of the other's phone number.

Another consideration regarding the initiation of wireless phone calls is the scenario of the known phone number, but with difficult dialing circumstances. For example, a user traveling along the roadway could see a billboard advertising and phone number of interest, but might not have time to either dial the phone number or write it down. Furthermore, it is well documented that such activities can be dangerous while driving, as well as inconvenient and time consuming. It is therefore desirable to provide an approach to initiating a wireless phone call that does not require the entry or recording of phone numbers by the caller.

SUMMARY OF THE INVENTION

The above and other objectives are achieved by a method and system in accordance with the present invention for managing wireless phone calls. A method for requesting initiation of a phone call includes the step of receiving a local request from a first user for initiation of the phone call with a second user. A primary phone number is then retrieved, where the primary phone number corresponds to the first user. The method further provides for transmitting a call initiation request to the second user, where the call initiation request includes the primary phone number. Including the primary phone number in the call initiation request eliminates the need for knowledge and entry of phone numbers by the parties.

Further in accordance with the present invention, a method for initiating a phone call is provided. The method includes the step of receiving a call initiation request, where the call initiation request includes a primary phone number corresponding to a first user. In a preferred embodiment, the method provides for receiving a line of sight signal, where the line of sight includes the call initiation request. The method further provides for requesting an authorization from a second user to initiate the call.

In another aspect of the invention, a wireless call management system includes a request module, an initiation module, and a wireless phone user interface. The request module transmits outgoing call initiation requests to remote users based on local requests from a local user. The outgoing call initiation requests include a phone number corresponding to the local user. The initiation module requests authorizations from the local user based on incoming call initiation requests. The incoming call initiation requests include phone numbers corresponding to the remote users. The wireless phone user interface generates the outgoing call initiation requests based on the local requests for initiation of phone calls. The user interface further transmits authorization requests to the local user based on the incoming call initiation requests.

BRIEF DESCRIPTION OF THE DRAWINGS

Additional objects, features and advantages of the present invention will become apparent from the following description and the appended claims when taken in connection with the accompanying drawings, wherein:

DETAILED DESCRIPTION OF THE PREFERRED EMBODIMENTS

Figure 1:
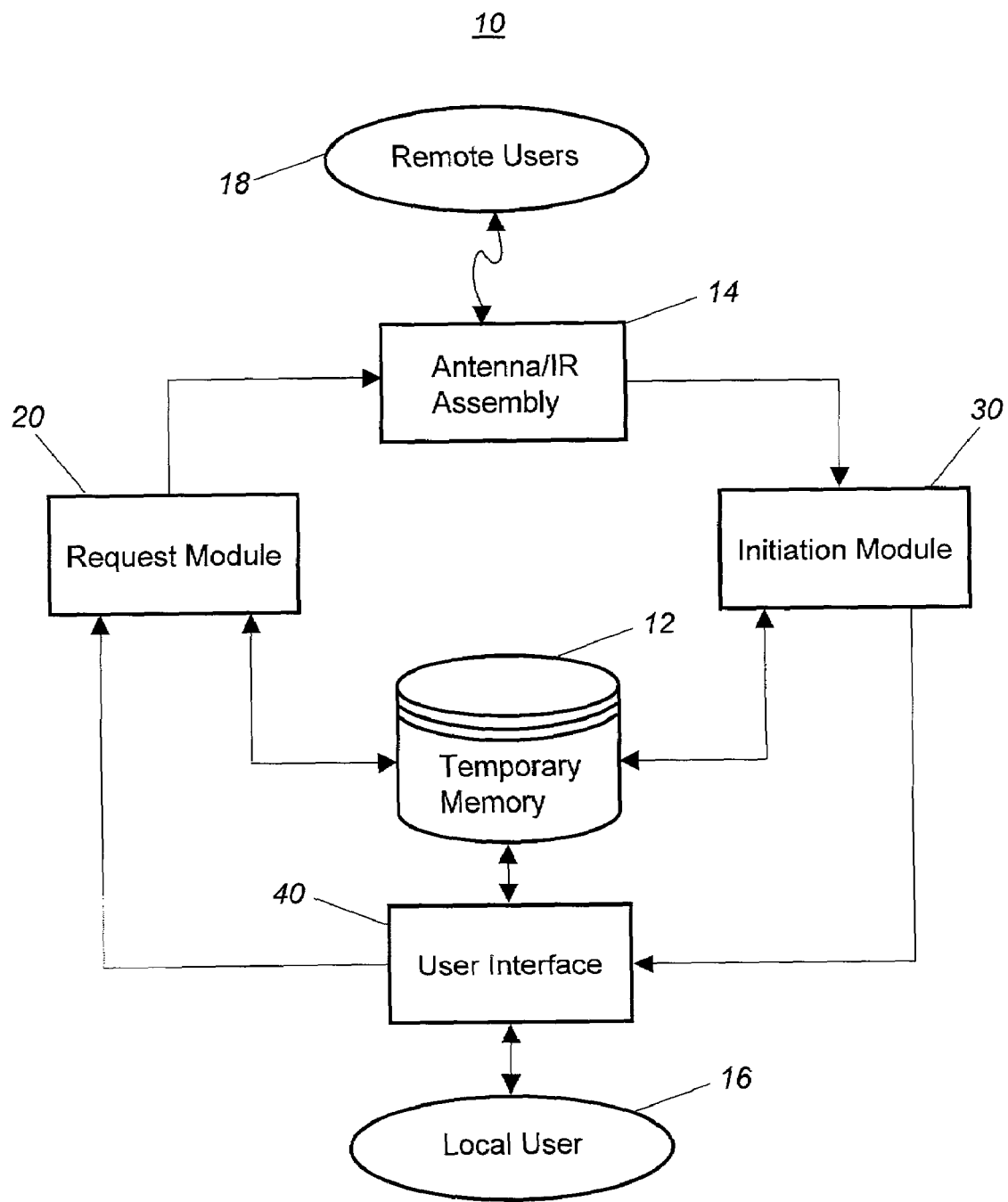
FIG. 1 is a block diagram of a wireless call management system in accordance with the present invention.

FIG. 1 shows a wireless management system 10 in accordance with the present invention. The management system 10 preferably has a request module 20 for transmitting outgoing call initiation requests to remote users 18 via IR assembly 14 based on local requests from a local user 16. Thus, when the local user 16 wishes to talk to a remote user 18, the local user 16 can press the appropriate button or switch (to be described later) on the user interface 40 to cause the generation of an outgoing call initiation request. As will be discussed below, these outgoing call initiation requests include the phone number corresponding to the local user 16.

The management system 10 further includes a call initiation module 30 for requesting authorizations from the local user 16 based on incoming call initiation requests from the IR assembly 14. In this case, one of the remote users 18 is requesting the local user 16 to initiate a call. Each incoming call initiation request includes a phone number corresponding to one of the remote users 18.

Figure 4:
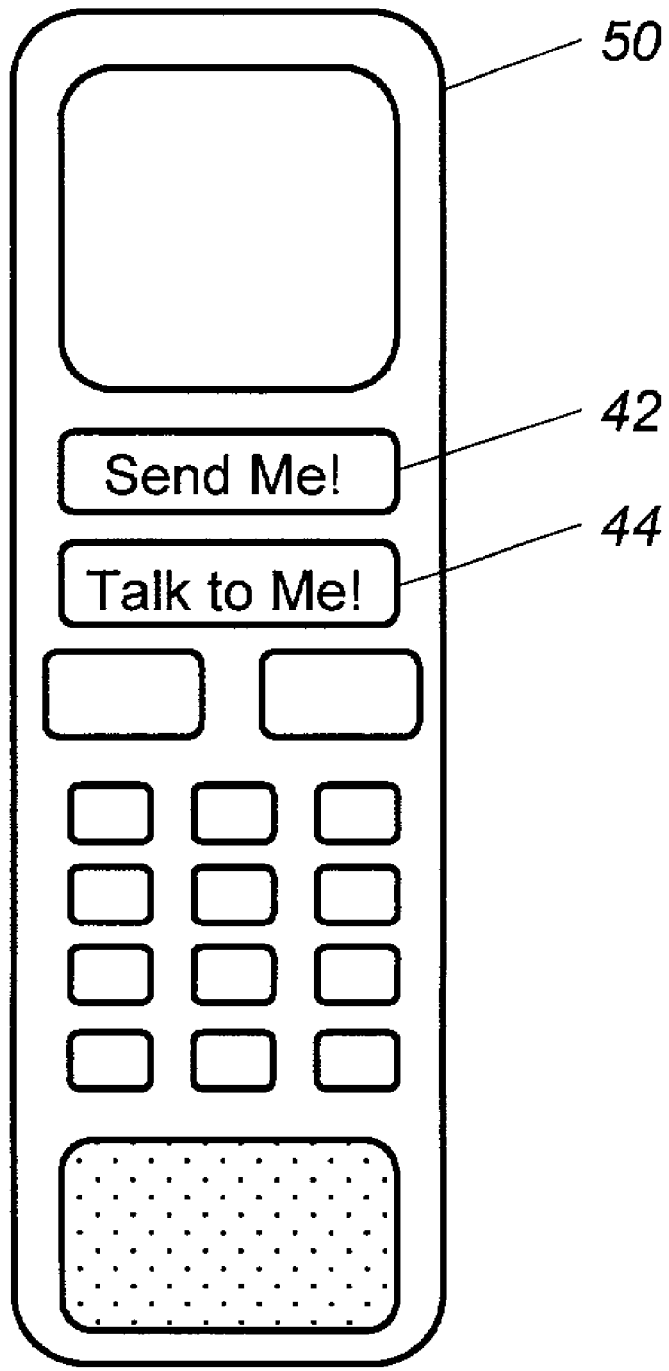
FIG. 4 is a diagram of a user interface in accordance with a preferred embodiment of the present invention.

The management system 10 further includes a wireless phone user interface 40 for generating the outgoing call initiation requests based on the local requests for initiation of phone calls. The user interface 40 further presents authorization requests to the local user 16 based on the incoming call initiation requests. The preferred user interface 40 is shown in FIG. 4. It can be seen that the "Send Me" button 42 provides the local user with a mechanism for generating local requests for initiation of phone calls. It will be appreciated that the local user will then simply wait for the wireless phone 50 to ring (if the remote user authorizes the call). If the local user is in receipt of an incoming call initiation request, the "Talk to Me" button 44 will illuminate as a mechanism for requesting authorization. The local user will press button 44 to authorize the call if so desired. The electronics necessary to implement the user interface 40 are well known in the art and are commercially available from a number of sources. The remaining components of the management system 10 can be implemented using conventional hardware and software techniques. It is also important to note that well known billing techniques allow the cost of the call to be shared between the two parties. The use of initiation requests including phone number information, as well as the use of authorization requests provides a mechanism for wireless phone interaction unavailable through conventional approaches.

Returning to FIG. 1, as will be discussed in greater detail below, the management system 10 preferably includes a computer readable memory 12 for storing the phone numbers corresponding to the remote users 18. This storage may either be temporary or permanent, depending upon the application. For example, if the initiation request is denied by the local user 16, security considerations could dictate deletion of the phone number from the memory 12. On the other hand, the local user 16 may be provided with the option of accepting the request and automatically transferring the phone number into a predetermined data structure (e.g. internal address book).

As already mentioned, the preferred management system 10 further includes an IR assembly 14 for transmitting the outgoing call initiation requests and receiving the incoming call initiation requests. It is highly preferred that the IR assembly 14 transmits and receives line of sight signals, and includes an infrared transceiver for transmitting and receiving infrared signals. This would allow strangers making eye contact from separate vehicles to "aim" their respective phones at one another and start a conversation. Furthermore, a user traveling along the roadway could aim his phone at any billboard of interest to initiate a phone call and request additional information.

Figure 2:
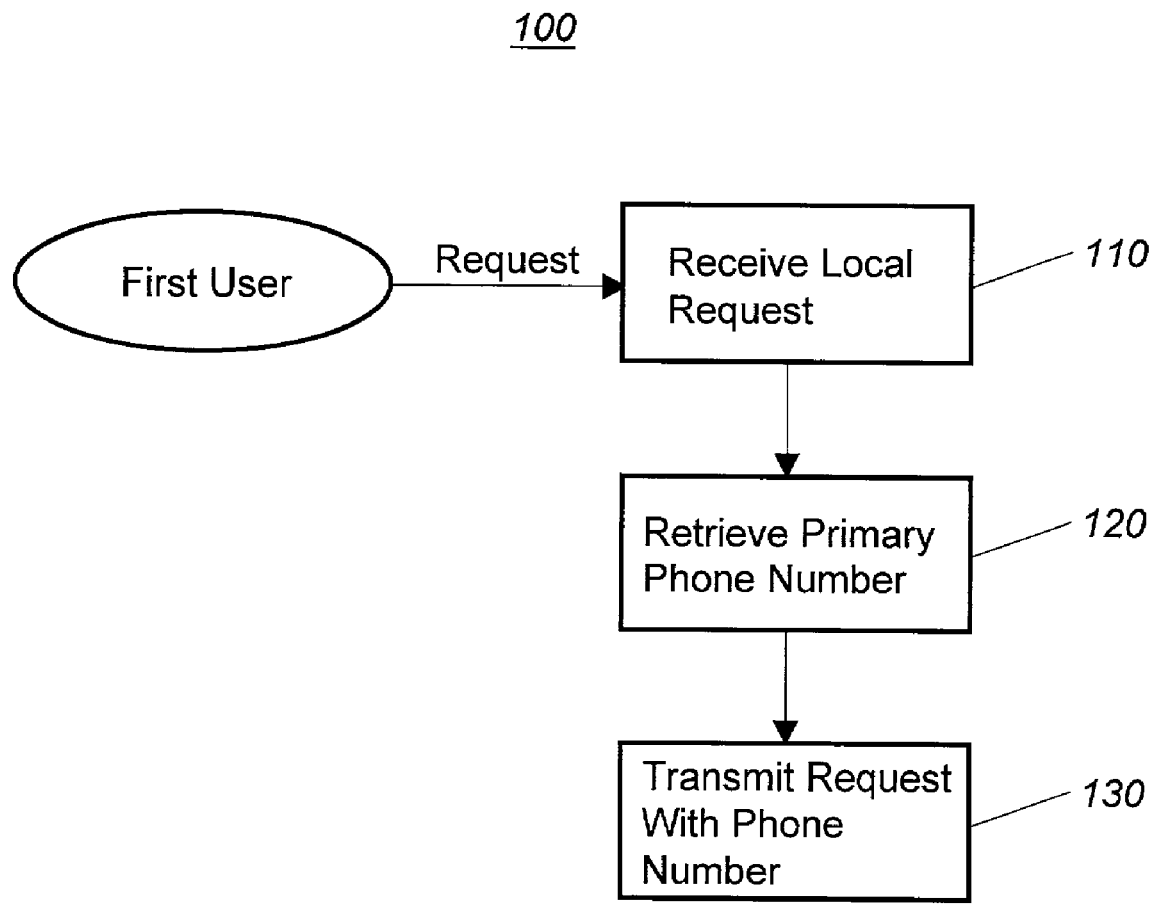
FIG. 2 is a flowchart of a method for requesting initiation of a phone call in accordance with the present invention.

Turning now to FIG. 2, a method 100 for requesting initiation of a phone call is shown for programming purposes. Generally, it can be seen that at step 110 a local request is received from a first user for initiation of the phone call with a second user. A primary phone number is retrieved at step 120, where the primary phone number corresponds to the first user. The method further provides for transmitting a call initiation request at step 130, where the call initiation request includes the primary phone number.

In the preferred embodiment, the call is a wireless phone call between users capable of seeing one another. In the above billboard example, the first user will have a line of sight with a receiver located on or around the billboard. The line of sight signal is preferably an infrared signal.

Figure 3:
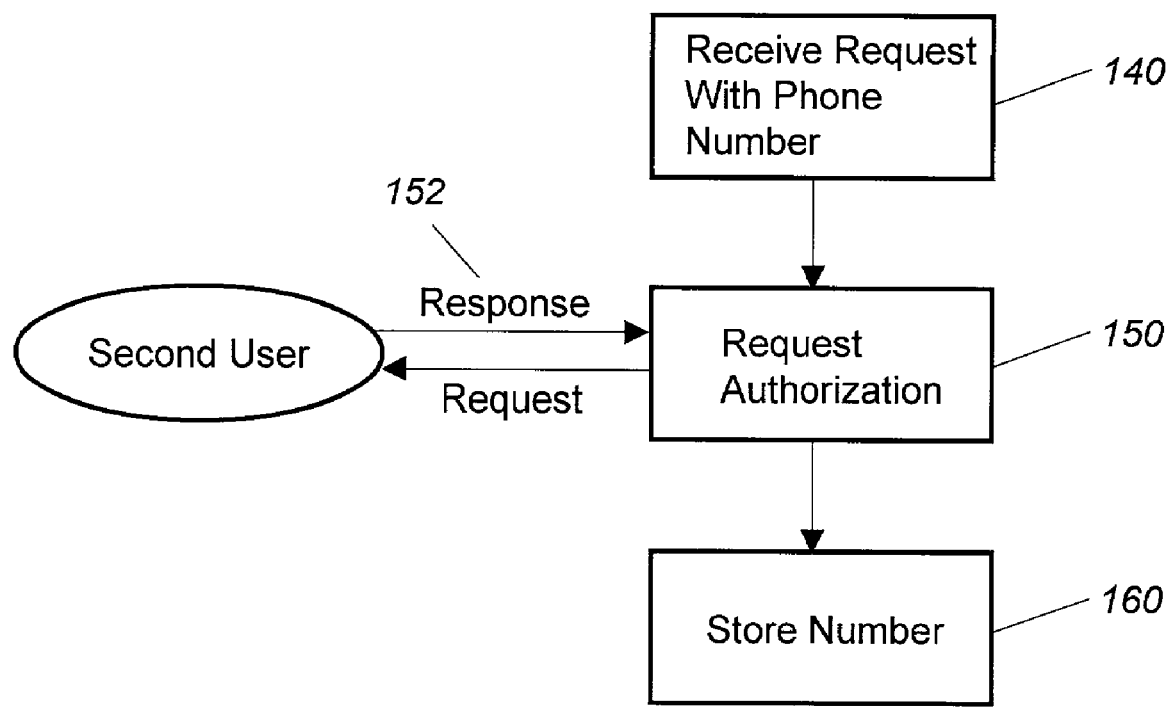
FIG. 3 is a method for initiating a phone call in accordance with the present invention.

FIG. 3 shows a method 102 for initiating a phone call for programming purposes. It can be seen that at step 140 a call initiation request is received, where the call initiation request includes a primary phone number corresponding to a first user. An authorization from a second user to initiate the call is requested at step 150. This can be done by transmitting an authorization request to either a wireless phone user interface, a standard land line connection, or any other type of communication link. It is preferred that while awaiting a response to the request for authorization, the primary phone number is stored to a computer readable memory at step 160.

It will be appreciated that the response 152 to the authorization request can automatically cause any number of events. For example, the call management system can dial the primary phone number upon receiving authorization, and delete the primary phone memory from the memory. Furthermore, the primary phone number can be deleted from the memory upon receiving a denial from the second user. If the second user fails to respond to the authorization request, the primary phone number can be deleted from the memory after a predetermined amount of time. As already discussed, other options such as transferring the primary phone number into an internal address book are also possible.

The present invention therefore provides a unique approach to initiating wireless phone calls. A call can be initiated between parties where there is no initial knowledge of phone numbers, or where dialing may be difficult. It is envisioned that the present invention can be applied to many applications ranging from commercial to purely social.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A method for initiating a phone call between first and second users, the method comprising the steps of:
   receiving a call initiation request from the first user by a communication device of the second user where the call initiation request represents a desire to establish a phone call with the specific second user identified by the first user, the call initiation request including a primary phone number corresponding to a first user, the call initiation request being a communication not part of a protocol used to establish a phone call;
   storing the primary phone number to a computer readable memory associated with the communication device of the second user, where the primary phone number is riot obtained as part of an incoming phone call initiated by the first user;
   requesting an authorization from a second user to initiate the call by which the second user consents to the call;
   dialing the primary phone number if authorization from the second user is received; and
   automatically deleting the primary phone number from the memory upon receipt of the authorization from the second user to initiate the call.

2. The method of claim 1 further including the steps of transmitting an authorization request to a wireless phone user interface.

3. The method of claim 1 further including the step of receiving a line of sight signal by the second user transmitted by the first user by which the first user identifies the specific second user, the line of sight signal including the call initiation request.

4. A method for initiating a phone call between first and second users, the method comprising the steps of:
   receiving a call initiation request from the first user by a communication device of the second user where the call initiation request represents a desire to establish a phone call with the specific second user identified by the first user, the call initiation request including a primary phone number corresponding to a first user, the call initiation request being a communication not part of a protocol used to establish a phone call;

storing the primary phone number to a computer readable memory associated with the communication device of the second user, where the primary phone number is not obtained as Part of an incoming phone call initiated by the first user;

requesting an authorization from a second user to initiate the call by which the second user consents to the call;

dialing the primary phone number if authorization from the second user is received; and automatically deleting the primary phone number from the memory upon receipt of a denial of authorization from the second user to initiate the call.

5. A wireless call management system comprising:

a computer readable memory for storing the phone numbers corresponding to the remote users;

a request module for transmitting outgoing call initiation request to a specific remote user based on a local request from a local user where the local user identifies the specific remote user with which a call is desired to be established, the outgoing call initiation request including a phone number corresponding to the local user;

an initiation module for requesting authorization from the local user based on incoming call initiation request by which the local user consents to the call from a remote user, the initiation module further operable to store the phone number of the remote user associated with the incoming call initiation request in the computer readable memory and to automatically delete the phone number from the computer readable memory, wherein the phone number is first obtained by the initiation module upon receipt of the primary phone number as part of the incoming call initiation request from a remote user, where the primary phone number is not obtained as part of an incoming phone call;

a wireless phone user interface for generating an outgoing phone call to the phone number of the remote user based on the local request by the remote user for initiation of a phone call, the user interface further transmitting authorization requests to the local user based on the incoming call initiation requests; and means for deleting the primary phone number from the computer readable memory automatically upon receipt of the authorization from the second user to initiate the call.

6. The call management system of claim 5 further including a signaling system for transmitting the outgoing call initiation request and receiving the incoming call initiation request.

7. The call management system of claim 6 wherein the signaling system transmits and receives line of sight signals that enable the local user to specifically identify the remote user with which a call is desired to be established.

8. The call management system of claim 7 wherein the signaling system includes an infrared transceiver for transmitting and receiving infrared signals.

9. A wireless call management system comprising:

a computer readable memory for storing the phone numbers corresponding to the remote users;

a request module for transmitting outgoing call initiation request to a specific remote user based on a local request from a local user where the local user identifies the specific remote user with which a call is desired to be established, the outgoing call initiation request including a phone number corresponding to the local user;

an initiation module for requesting authorization from the local user based on incoming call initiation request by which the local user consents to the call from a remote user, the initiation module further operable to store the phone number of the remote user associated with the incoming call initiation request in the computer readable memory and to automatically delete the phone number from the computer readable memory, wherein the phone number is first obtained by the initiation module upon receipt of the primary phone number as Part of the incoming call initiation request from a remote user, where the primary phone number is not obtained as part of an incoming phone call; and a wireless phone user interface for generating an outgoing phone call to the phone number of the remote user based on the local request by the remote user for initiation of a phone call, the user interface further transmitting authorization requests to the local user based on the incoming call initiation requests; and means for deleting the primary phone number automatically upon receipt of a denial of authorization from the second user to initiate the call.

10. The method of claim 4 further comprises dialing the primary phone number upon receiving the authorization.

* * * * *